United States Patent
Stettner et al.

(10) Patent No.: US 9,433,139 B2
(45) Date of Patent: Sep. 6, 2016

(54) WING LOCKING ASSEMBLY FOR AN AGRICULTURAL IMPLEMENT

(75) Inventors: Cameron Wade Stettner, Kindersley (CA); Matthew Stuart Naylor, Saskatoon (CA); Terrance Alan Friggstad, Grasswood (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 124 days.

(21) Appl. No.: 13/277,689

(22) Filed: Oct. 20, 2011

(65) Prior Publication Data

US 2013/0098645 A1    Apr. 25, 2013

(51) Int. Cl.
A01B 73/04    (2006.01)

(52) U.S. Cl.
CPC .................. *A01B 73/044* (2013.01)

(58) Field of Classification Search
CPC ..................................... A01B 73/044
USPC .................................. 172/311, 456
See application file for complete search history.

(56) References Cited

U.S. PATENT DOCUMENTS

| | | | |
|---|---|---|---|
| 2,952,472 A | | 9/1960 | McNeill |
| 3,814,191 A | * | 6/1974 | Tilbury .......................... 172/311 |
| 3,944,001 A | | 3/1976 | Warner et al. |
| 4,050,523 A | * | 9/1977 | Poland .......................... 172/311 |
| 4,074,766 A | | 2/1978 | Orthman |
| 4,232,747 A | | 11/1980 | Pfenninger et al. |
| 4,512,416 A | | 4/1985 | Smith |
| 4,529,040 A | | 7/1985 | Grollimund |
| 4,607,708 A | | 8/1986 | Landphair et al. |
| 4,660,654 A | | 4/1987 | Wiebe et al. |
| 4,862,758 A | | 9/1989 | Magee |
| 4,878,545 A | | 11/1989 | Dyken |
| 5,135,057 A | | 8/1992 | Dircks |
| 5,740,870 A | | 4/1998 | Rodgers et al. |
| 7,497,269 B2 | * | 3/2009 | Jagow .......................... 172/311 |
| 7,640,719 B2 | | 1/2010 | Boyko |

FOREIGN PATENT DOCUMENTS

DE    3827624 A1    3/1989

OTHER PUBLICATIONS

PCT International Search Report and Written Opinion mailed Feb. 14, 2013.
PCT International Preliminary Report on Patentability mailed May 1, 2014.

* cited by examiner

*Primary Examiner* — Thomas B Will
*Assistant Examiner* — Joel F. Mitchell
(74) *Attorney, Agent, or Firm* — Rebecca L. Henkel (57) ABSTRACT

A wing locking assembly for an agricultural implement is provided. One agricultural implement includes a first frame section having a mounted bracket and a second frame section pivotally coupled to the first frame section. A cam is mounted to the second frame section. The implement includes an actuating cylinder having a first end pivotally coupled to the second frame section, and a second end disposed within a slot of the bracket. The implement also includes a locking mechanism rotatably coupled to the bracket. The locking mechanism includes a first end configured to engage the second end of the actuating cylinder, and a second end configured to abut the cam. The locking mechanism is configured to drive the second end of the actuating cylinder into a desired position within the slot upon contact between the cam and the second end of the locking mechanism.

20 Claims, 6 Drawing Sheets

WING LOCKING ASSEMBLY FOR AN AGRICULTURAL IMPLEMENT

BACKGROUND

The invention relates generally to an agricultural implement and, more particularly, to a wing locking assembly for an agricultural implement.

Certain agricultural implements (e.g., planters, seeders, etc.) include a center section and one or more wing sections extending laterally outward from the center section. In such implements, the wing sections may be pivotally coupled to the center section such that the wing sections may be transitioned between a lowered transport position and a raised working position. In certain configurations, an actuating cylinder extending between the center section and each wing section facilitates movement of each wing section between the transport and working positions. Specifically, a first end of the actuating cylinder is pivotally coupled to a frame of the wing section, and a second end of the actuating cylinder is coupled to a frame of the center section. In certain embodiments one of the couplings may be disposed within a slot on the wing or center section. The slot facilitates free movement of one end of the actuating cylinder, thereby enabling the wing section to pivot relative to the center section during field operation. Consequently, the wing sections may adjust to uneven ground surfaces while the implement is moving through a field, even without active hydraulic control. Unfortunately, this may allow one end of the actuating cylinder to slip and fall a short distance while the wing section is being folded into or unfolded from transport position. For example, when the center of gravity of a wing section passes over a hinge line, the wing section may free fall for a short distance within the slot. Such a fall may cause increased wear of the wing section components, or even structural harm. In certain configurations it is possible to geometrically orient the slot to prevent free fall, but this can become difficult or not feasible as the angle of wing fold increases (e.g., when the implement is designed to reduce its transport height).

BRIEF DESCRIPTION

In one embodiment, an agricultural implement includes a first frame section and a bracket mounted to the first frame section. The bracket includes a slot. The implement also includes a second frame section pivotally coupled to the first frame section and a cam mounted to the second frame section. The implement includes an actuating cylinder having a first end pivotally coupled to the second frame section, and a second end disposed within the slot. The actuating cylinder is configured to induce the second frame section to rotate between a raised transport position and a lowered working position. The implement also includes a locking mechanism rotatably coupled to the bracket. The locking mechanism includes a first end configured to engage the second end of the actuating cylinder, and a second end configured to abut the cam. The locking mechanism is configured to drive the second end of the actuating cylinder into a desired position within the slot upon contact between the cam and the second end of the locking mechanism.

In another embodiment, an agricultural implement includes a first toolbar and a second toolbar pivotally coupled to one another. The implement also includes an actuating cylinder having a first end pivotally coupled to the second toolbar, and a second end disposed within a slot in a bracket of the first toolbar. The actuating cylinder is configured to drive the second toolbar to rotate between a raised transport position and a lowered working position, and the second end of the actuating cylinder is configured to move within the slot. The implement includes a locking mechanism rotatably coupled to the bracket of the first toolbar, and configured to drive the second end of the actuating cylinder into a desired position within the slot upon contact between a cam of the second toolbar and the locking mechanism.

In another embodiment, an agricultural implement includes a first toolbar having a slot and a second toolbar pivotally coupled to the first toolbar. The implement also includes an actuating cylinder having a first end pivotally coupled to the second toolbar, and a second end disposed within the slot. The actuating cylinder is configured to induce the second toolbar to rotate between a raised transport position and a lowered working position. The implement includes a locking assembly having a cam coupled to the second toolbar, and a locking mechanism rotatably coupled to the first toolbar. The locking mechanism is configured to drive the second end of the actuating cylinder into a desired position within the slot upon contact between the cam and the locking mechanism.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
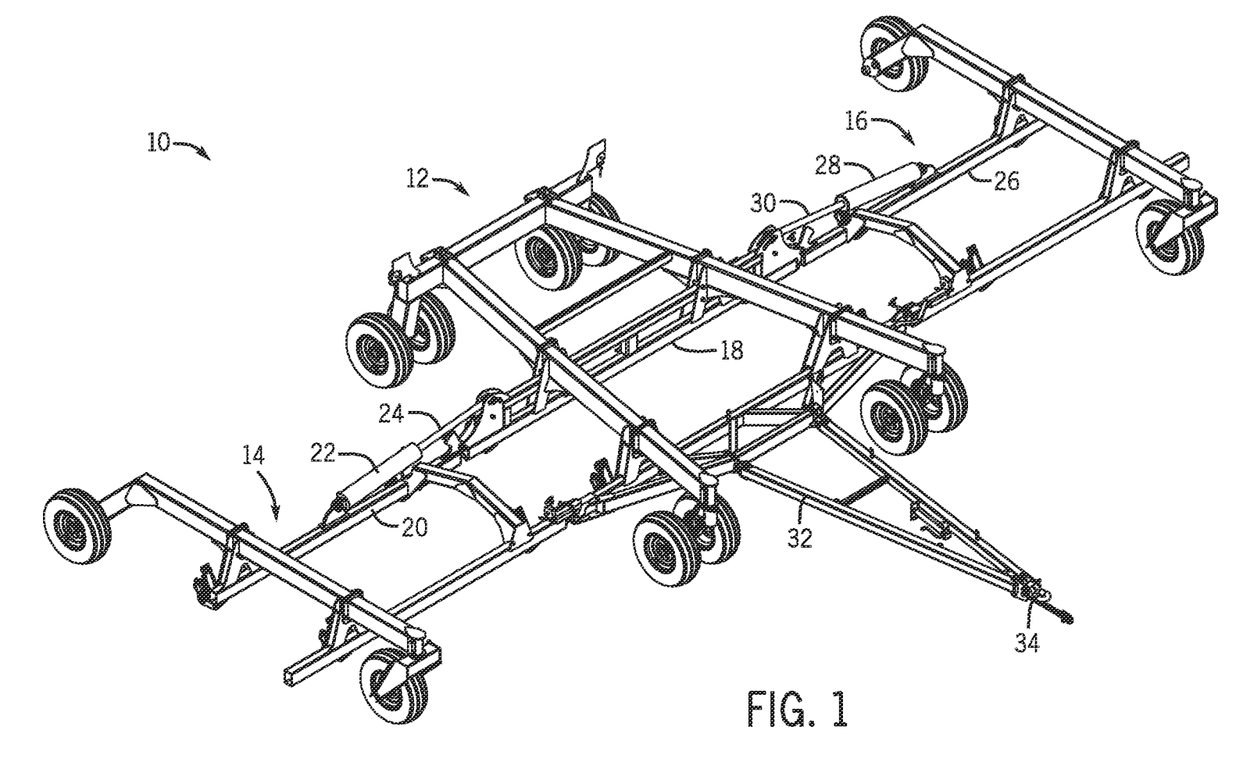
FIG. 1 is a perspective view of a towable agricultural implement employing an embodiment of a wing locking assembly.

FIG. 1 is a perspective view of a towable agricultural implement 10 employing an embodiment of a wing locking assembly. The implement 10 includes a center section 12, a first wing section 14, and a second wing section 16. Each section is configured to support multiple ground engaging tools, such as openers, row units and/or coulters. In the illustrated embodiment, the center section 12 includes a center toolbar 18 that forms a portion of a frame for attaching the ground engaging tools. The first wing section 14 and the second wing section 16 are rotatably coupled to the center wing section 12, thereby enabling the wing sections 14 and 16 to follow the contours of a field while the wing sections are in the illustrated working position. As discussed in detail below, the first and second wing sections are also configured to transition to a transport portion that substantially decreases the width of the implement 10.

The first wing section 14 includes a first wing toolbar 20 that forms a portion of a frame for attaching ground engaging tools. As shown, an actuating cylinder 22 extends between the first wing toolbar 20 and the center toolbar 18. The actuating cylinder 22 includes a piston rod 24 that may be hydraulically or pneumatically controlled, for example. A first end of the actuating cylinder 22 is pivotally coupled to the first wing toolbar 20, and a second end is coupled to the center toolbar 18. In this configuration, the piston rod 24 may be extended to drive the first wing section 14 toward the illustrated working position, and retracted to drive the first wing section 14 toward a folded/raised transport position.

The second wing section 16 is configured much like the first wing section 14. The second wing section 16 includes a second wing toolbar 26 that forms a portion of a frame for attaching ground engaging tools. A second actuating cylinder 28 extends between the second wing toolbar 26 and the center toolbar 18. The actuating cylinder 28 includes a piston rod 30 that may be hydraulically or pneumatically controlled, for example. A first end of the actuating cylinder 28 is pivotally coupled to the second wing toolbar 26, and a second end is coupled to the center toolbar 18. In this configuration, the piston rod 30 may be extended to drive the second wing section 16 toward the illustrated working position, and retracted to drive the second wing section 16 toward a folded/raised transport position. In the illustrated embodiment, the center section 12 is coupled to a tow bar 32, including a hitch 34. The hitch 34 may, in turn, be coupled to a tractor, or other tow vehicle, such that the towable agricultural implement 10 may be pulled through a field.

As discussed in detail below, each wing section 14 and 16 includes a wing locking assembly. The wing locking assemblies enable the wing sections 14 and 16 to rotate relative to the center section 12 while the wing sections 14 and 16 are in the illustrated working position, thereby enabling the wing sections 14 and 16 to follow the contours of uneven surfaces of the field. To facilitate rotation of the wing sections 14 and 16, the piston rods 24 and 30 are attached to slots within the center section 12, thereby enabling the second end of each actuating cylinder to move within a respective slot. When the wing sections 14 and 16 are rotated from the illustrated working position to a raised transport position, each locking assembly blocks movement of the second end of each actuating cylinder within the respective slot, thereby substantially reducing unwanted movement of the wing sections. Such a locking mechanism blocks the wing sections 14 and 16 from free falling during the transition from the lowered working position to the raised transport position.

Figure 2:
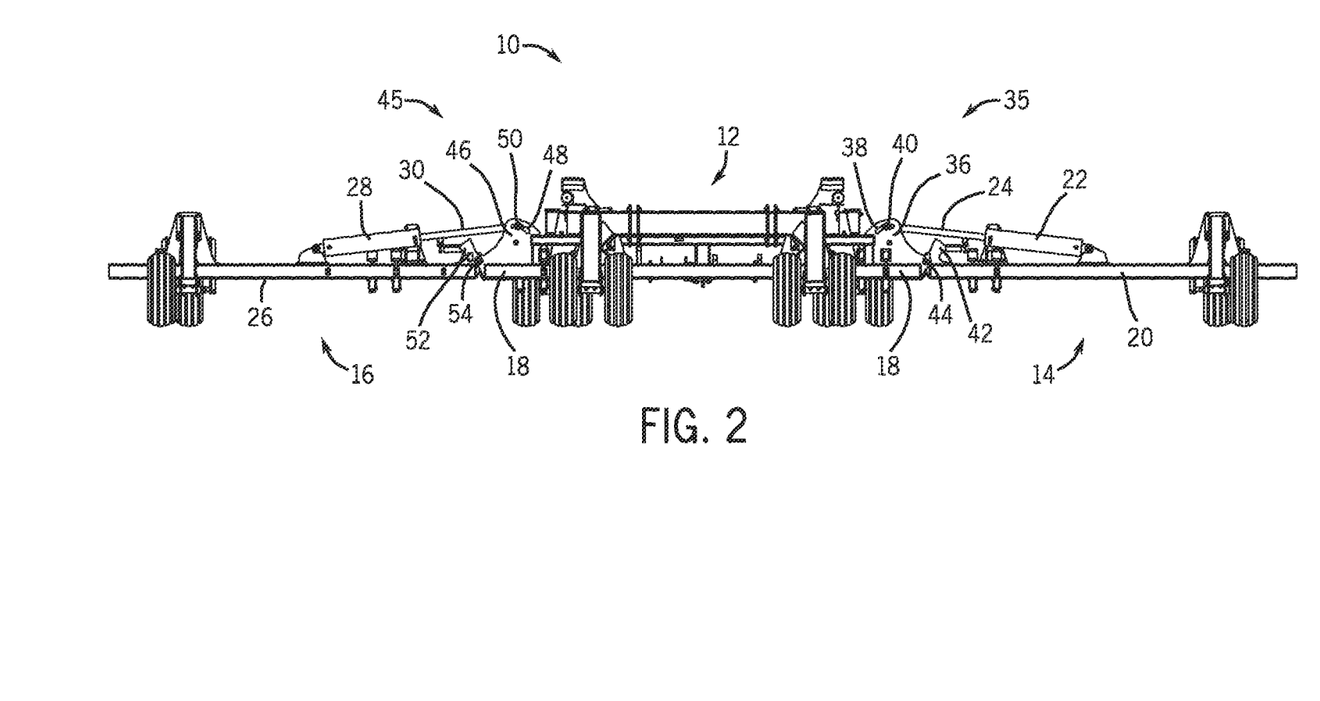
FIG. 2 is a rear view of the towable agricultural implement of FIG. 1.

FIG. 2 is a rear view of the towable agricultural implement 10 of FIG. 1 with an embodiment of a wing locking assembly. A first wing locking assembly 35 includes a locking mechanism which is located behind a first rear bracket 36. The first rear bracket 36 is coupled to the center toolbar 18, and includes a slot 38. Although the slot 38 is curved in the illustrated embodiment, it should be appreciated that the slot 38 may be otherwise contoured in alternative embodiments. For example, the slot 38 may be straight and horizontal, the slot 38 may be straight and vertical, the slot 38 may be straight and angled, the slot 38 may include straight and/or rounded portions, or the slot 38 may be any other suitable shape. As illustrated, an end 40 of the piston rod 24 is disposed within to the slot 38. In this configuration, the end 40 of the piston rod 24 may move within the slot 38 as the implement 10 traverses a field. As such, the first wing section 14 may rotate relative to the center section 12 based on the terrain. The first wing locking assembly 35 includes a cam 42 coupled to the first wing toolbar 20. The cam 42 is rotatably, or pivotally, coupled to the first rear bracket 36 via a fastener 44. Thus, the first wing section 14 may pivot about the fastener 44 as the end 40 of the piston rod 24 moves within the slot 38. In alternative embodiments, the actuating cylinder 22 may be pivotally coupled to the center toolbar 18, and the slot 38 may be located within the first wing section 14. In such embodiments, the cam 42 may be coupled to the center section 12.

As discussed in greater detail below, when the first wing section 14 is rotated from the lowered working position to the raised transport position, the first wing locking assembly 35 controls the movement of the second end 40 of the actuating cylinder 22 within the slot 38. Specifically, the first wing toolbar 20 and the cam 42 rotate about the fastener 44 as the piston rod 24 retracts. The cam 42 then engages a locking mechanism, thereby inducing the locking mechanism to hold the second end 40 of the actuating cylinder in a desired position within the slot 38. As a result, rotation of the first wing section 14 relative to the center section 12 is blocked, thereby substantially reducing the possibility of free fall that may otherwise occur when the center of gravity of the wing section passes over a hinge line.

Much like the first wing locking assembly 35, a second wing locking assembly 45 includes a locking mechanism which is located behind a second rear bracket 46. The second rear bracket 46 is coupled to the center toolbar 18, and includes a slot 48. As illustrated, an end 50 of the piston rod 30 is disposed within the slot 48. In this configuration, the end 50 of the piston rod 30 may move within the slot 48 as the implement 10 traverses a field. As such, the second wing section 16 may rotate relative to the center section 12 based on the terrain. The second wing locking assembly 35 includes a cam 52 coupled to the second wing toolbar 26. The cam 52 is rotatably, or pivotally, coupled to the second rear bracket 46 via a fastener 54. Thus, the second wing section 16 may pivot about the fastener 54 as the end 50 of the piston rod 30 moves within the slot 48. In alternative embodiments, the actuating cylinder 28 may be coupled to the center toolbar 18, and the slot 48 may be located within the second wing section 16. In such embodiments, the cam 52 may be coupled to the center section 12.

Again, the second wing section 16 functions much like the first wing section 14. For example, when the second wing section 16 is rotated from the lowered working position to the raised transport position, the second wing locking assembly 45 controls the movement of the second end 50 of the actuating cylinder in a desired position within the slot 48. Specifically, the second wing toolbar 26 and the cam 52 rotate about the fastener 54 as the piston rod 30 retracts. The cam 52 then engages a locking mechanism, thereby inducing the locking mechanism to hold the second end 50 of the actuating cylinder in a desired position within the slot 48. As a result, rotation of the second wing section 16 relative to the center section 12 is blocked, thereby substantially reducing the possibility of free fall that may otherwise occur when the center of gravity of the wing section passes over a hinge line.

It should be noted that the term "toolbar" as used herein may be interpreted broadly to include the complete frame structure of a section. For example, the center section 12 includes the toolbar 18, the first wing section 14 includes the first wing toolbar 20, and the second wing section 16 includes the second wing toolbar 26. The "toolbar" (e.g., toolbar 18, 20, and 26) may include one or more brackets (e.g., rear brackets 36 and 46), locking assemblies 35 and 45, cams 42 and 52, or any other similar structure. The tool bars may also form a portion of a frame of each section.

Figure 3:
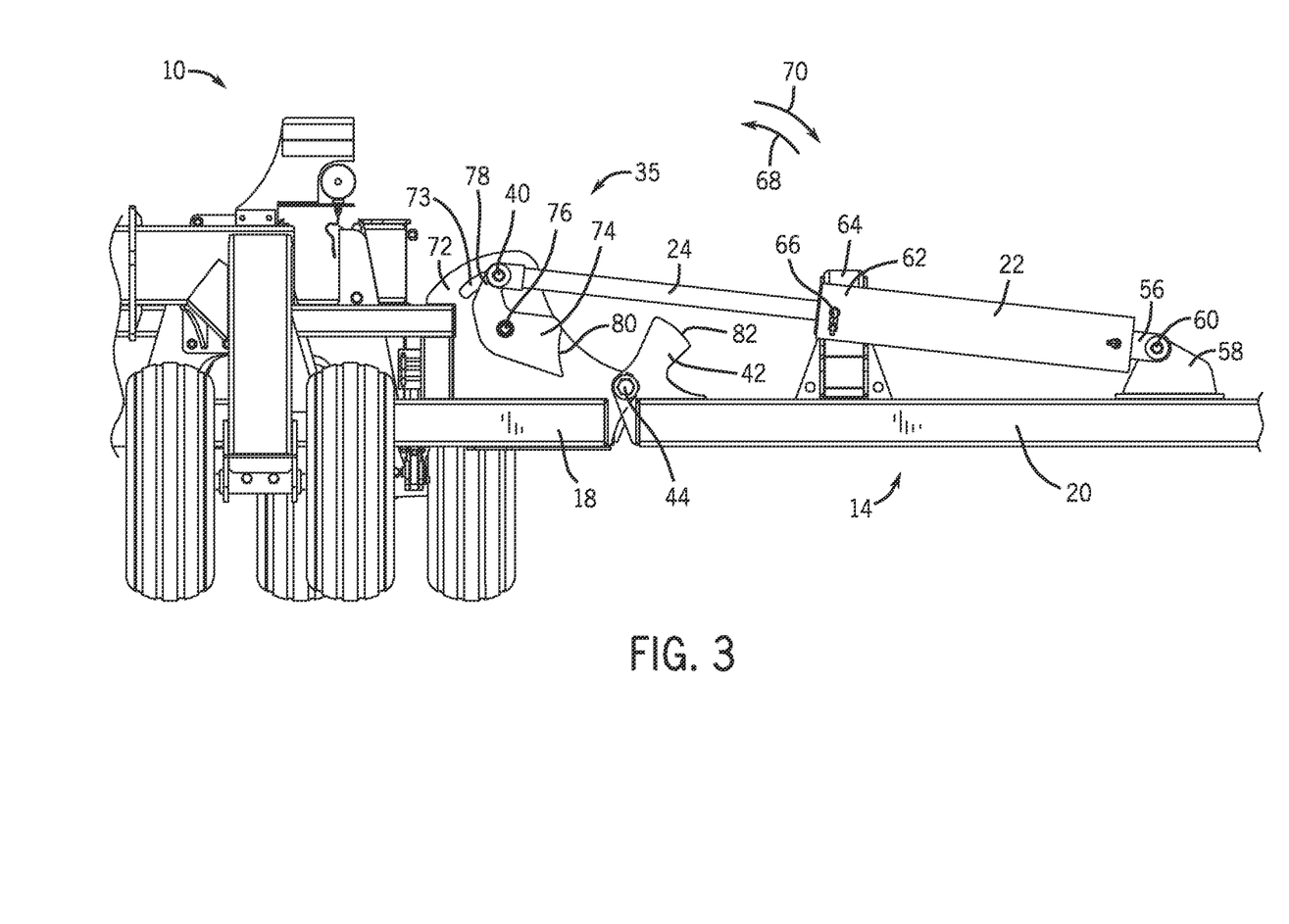
FIG. 3 is a detailed rear view of a first wing section of the towable agricultural implement of FIG. 1, illustrating an embodiment of a wing locking assembly.

FIG. 3 is a detailed rear view of the first wing section 14 of the towable agricultural implement 10 of FIG. 1, illustrating an embodiment of the wing locking assembly 35. The actuating cylinder 22 includes a mounting end 56, which is pivotally coupled to a bracket 58 by a fastener 60. The bracket 58 is attached to the first wing toolbar 20. In addition, the actuating cylinder 22 includes an end 62 located on an opposite side from the mounting end 56, adjacent to support 64. At end 62, the piston rod 24 is attached to the actuating cylinder 22 using a hydraulic fitting 66. As previously discussed, the piston rod 24 may extend and retract to facilitate rotation of the first wing toolbar 20 relative to the center toolbar 18. For example, the piston rod 24 may retract to drive the first wing section 14 to rotate in a direction 68 toward a raised transport position. Conversely, the piston rod 24 may extend to drive the first wing section 14 to rotate in a direction 70 toward the illustrated working position.

As illustrated, the first rear bracket 36 has been omitted from FIG. 3 to show other parts of the first wing locking assembly 35. In particular, a front bracket 72 is coupled to the center toolbar 18, and includes a slot 73. The end 40 of the piston rod 24 (i.e., second end of the actuating cylinder 22) is disposed within the slot 73, and the slot 38 of the bracket 36, thereby enabling the piston rod 24 to move relative to the brackets 72 and 36. The first wing locking assembly 35 includes a locking mechanism or member 74. The locking mechanism 74 is rotatably coupled to the front bracket 72 and to the first rear bracket 36 via a fastener 76. The fastener 76 facilitates rotational motion of the locking mechanism 74, thereby enabling a holding end 78 of the locking mechanism to move along the slot 73. In certain embodiments, a bushing or bearing may be disposed about the fastener 76 to facilitate rotation of the locking mechanism 74. The holding end 78 is rotatably coupled to the end 40 of the piston rod 24 with a fastener. In the illustrated embodiment, the holding end 78 is rounded, or o-shaped, to enable the fastener 76 to be inserted within the end 78. However, in other embodiments, the holding end 78 may be c-shaped, u-shaped, or any other suitable shape. In such embodiments, the end 78 may cradle the end 40 of the piston rod 24 without necessarily being fastened to it.

The locking mechanism 74 has a locking end 80 configured to abut an end 82 of the cam 42. In certain embodiments, the locking end 80 may include rollers to enable smooth contact between the locking end 80 and the cam 42. In certain embodiments, the locking end 80 may be substantially u-shaped and configured to engage a substantially c-shaped cam 42. When the first wing section 14 is rotated from the illustrated working position in the direction 68, the first wing section 14 rotates around the fastener 44. As the first wing section 14 rotates, the cam end 82 engages the locking end 80, thereby driving the locking mechanism 74 to hold the end 40 of the piston rod 24 in a desired position (e.g., against the end of the slot 73). Thus, the end 40 of the piston rod 24 is blocked from free falling within the slot 73 during the transition from the lowered working position to the raised transport position, thereby substantially reducing wear and loading on the wing section components.

Figure 4:
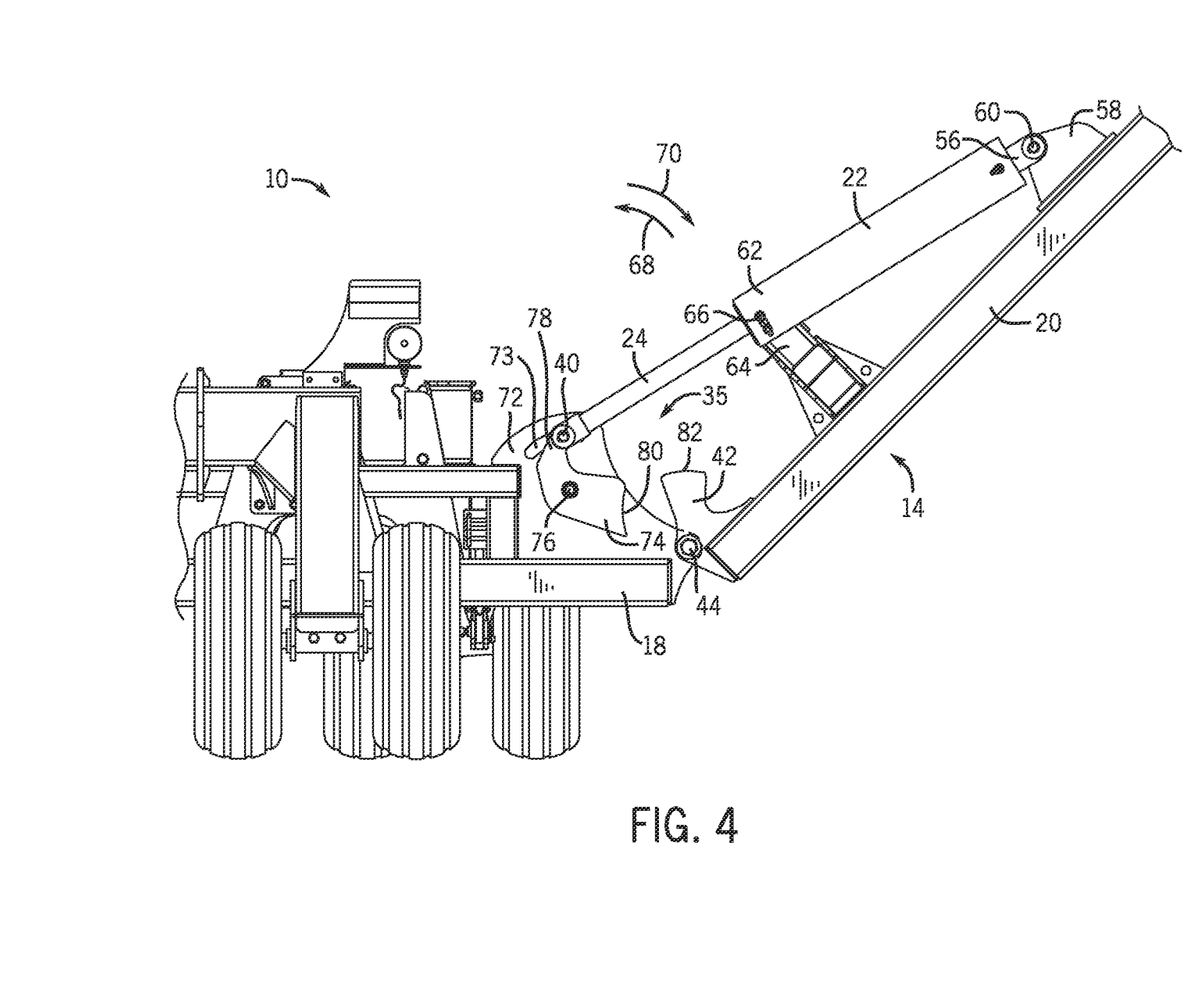
FIG. 4 is a detailed rear view of the first wing section of FIG. 3, illustrating the first wing section partially folded.
Figure 5:
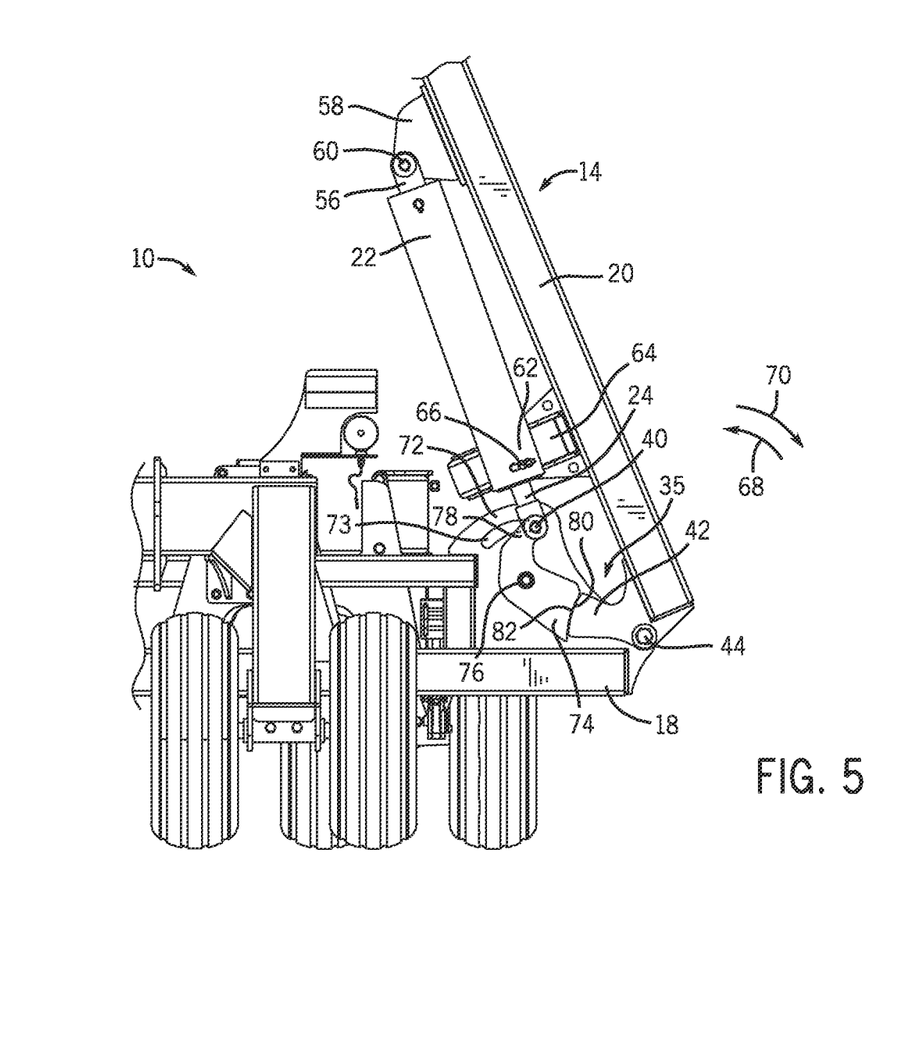
FIG. 5 is a detailed rear view of the first wing section of FIG. 3, illustrating the first wing section folded near a transport position.

FIG. 4 is a detailed rear view of the first wing section 14 of FIG. 3, illustrating the first wing section 14 partially folded. As illustrated, the first wing toolbar 20 is rotated approximately 45 degrees from the working position illustrated in FIG. 3. The cam end 82 is near the locking end 80 but not abutting the locking end 80. FIG. 5 is a detailed rear view of the first wing section 14 of FIG. 3, illustrating the first wing section 14 folded near a transport position. In this figure, the first wing toolbar 20 is rotated approximately 100 degrees from the working position illustrated in FIG. 3. The cam end 82 abuts the locking end 80, thereby holding the end 40 of the piston rod 24 against the end of the slot 73. Therefore, the first wing section 14 is locked in place to inhibit the wing section 14 from free falling within the slot 73.

As the piston rod 24 is retracted into the actuating cylinder 22, the end 40 of the piston rod 24 is pulled to the end of the slot 73 closest to the first wing section 14. As a result, the first wing toolbar 20 rotates from a generally horizontal position (i.e., approximately 0 degrees) toward a vertical position. (i.e., approximately 90 degrees). The first wing toolbar 20 rotates along a pivot, or hinge line, created where the fastener 44 couples the first wing toolbar 20 to the center toolbar 18. When the center of gravity of the wing section 14 passes over the hinge line, the weight of the wing section 14 drives the end 40 of the piston rod 24 to move within the slot 73. Therefore, without the locking mechanism 74, the end 40 of the piston rod 24 may move within the slot 73 (e.g., the first wing section 14 may free fall a short distance). However, in the illustrated embodiment, the locking mechanism 74 holds the end 40 of the piston rod 24 in a desired position (e.g., against the end of the slot 73), thereby blocking movement of the frame section 14, and facilitating smooth wing section 14 folding. Furthermore, the shape and size of the slot 73 allows the first wing section 14 to have a wide range of movement over terrain while the first wing section 14 is in the working position. While the illustrated configuration facilitates rotation of the first wing section through an angle of approximately 130 degrees from the horizontal position, it should be appreciated that alternative configurations may enable the frame section to rotate through a larger or smaller angle.

Figure 6:
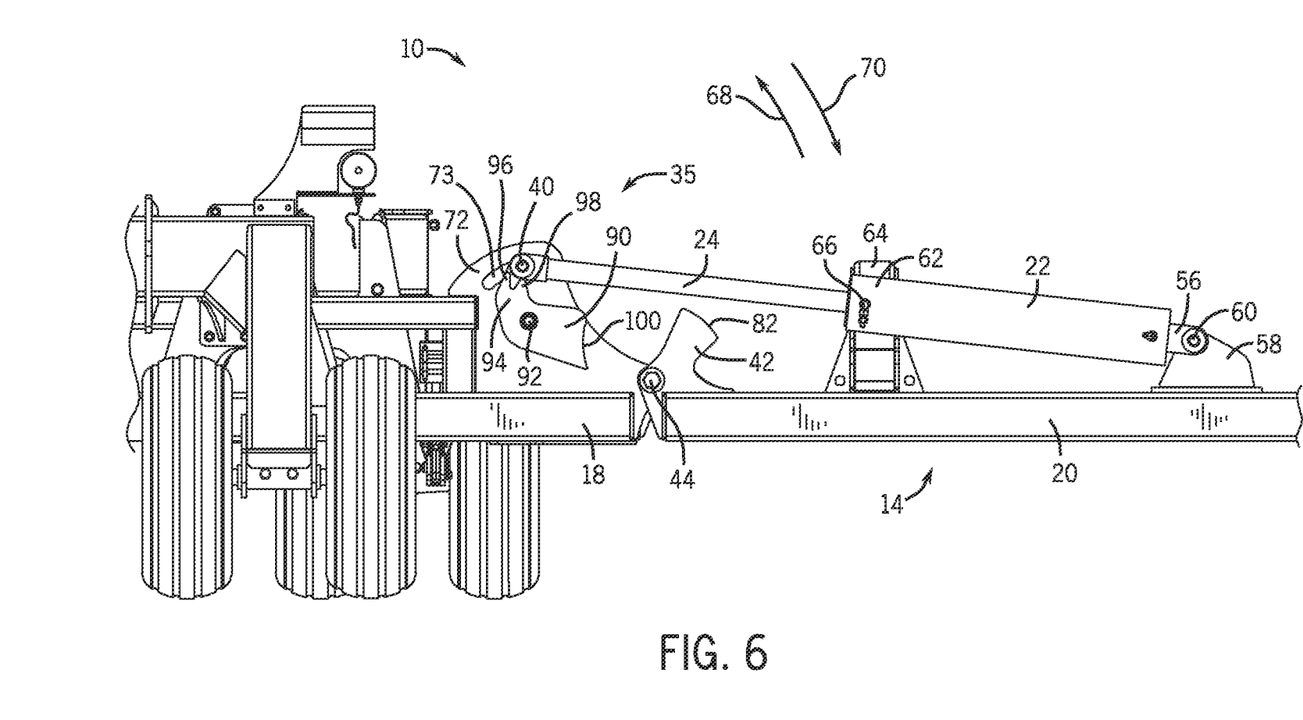
FIG. 6 is a detailed rear view of a first wing section of the towable agricultural implement of FIG. 1, illustrating another embodiment of a wing locking assembly.

FIG. 6 is a detailed rear view of the first wing section 14 of FIG. 1, illustrating another embodiment of a wing locking assembly 35. In the illustrated embodiment, a locking mechanism 90 is rotatably coupled to the front bracket 72 by a fastener 92. In certain embodiments, a bushing or bearing may be disposed about the fastener 92 to facilitate rotation of the locking mechanism 90. The locking mechanism 90 has a holding end 94, which is c-shaped, or u-shaped, and includes fingers 96 and 98 to capture the end 40 of the piston rod 24. The locking mechanism 90 also has a locking end 100 configured to abut the end 82 of the cam 42.

As the first frame section 14 rotates in the direction 68, the cam end 82 engages the locking end 100. The force on the locking end 100 urges the locking mechanism 90 to rotate, thereby driving the holding end 94 to capture the end 40 of the piston rod 24. The fingers 96 and 98 press against the end 40 to hold the end 40 in a desired position within the slot 73. Therefore, the locking mechanism 90 locks the first wing section 14 in place to block movement of the first wing section 14 while the wing section 14 is in the raised transport position. The locking mechanism 90 functions similar to the locking mechanism 74. However, when the first wing section 14 is in the working position, as illustrated, the locking mechanism 90 does not generally interfere with movement of the end 40 of the piston rod 24 as it is not connected to the end 40.

As may be appreciated, the functionality of the first wing section 14 described above in relation to FIGS. 3 through 6 also applies to the second wing section 16. Further, while only certain features of the invention have been illustrated and described herein, many modifications and changes will occur to those skilled in the art. For example, a wing locking assembly may be used between an outer secondary wing, and a primary inner wing, to allow for multi-fold implements (e.g., in an implement that has five sections instead of three). It is, therefore, to be understood that the appended claims are intended to cover all such modifications and changes as fall within the true spirit of the invention.

The invention claimed is:

1. An agricultural implement comprising:
   a first frame section;
   a bracket fixedly mounted directly to the first frame section, wherein the bracket includes a slot;
   a second frame section pivotally coupled to the first frame section;
   a cam non-rotatably mounted directly to the second frame section;
   an actuating cylinder having a first end pivotally coupled to the second frame section, and a second end directly coupled between longitudinal ends of the slot, wherein the second end is configured to slide within the slot between the longitudinal ends, and the actuating cylinder is configured to induce the second frame section to rotate between a raised transport position and a lowered working position; and
   a locking mechanism rotatably coupled to the bracket, wherein the locking mechanism includes a first end configured to engage the second end of the actuating cylinder, and a second end configured to abut the cam, and wherein the locking mechanism is configured to drive the second end of the actuating cylinder into a desired position within the slot in response to contact between the cam and the second end of the locking mechanism.

2. The implement of claim 1, wherein the first end of the locking mechanism is rotatably coupled to the second end of the actuating cylinder.

3. The implement of claim 1, wherein the second end of the locking mechanism is substantially u-shaped, and configured to engage a substantially c-shaped end of the cam.

4. The implement of claim 1, wherein the locking mechanism is configured to block uncontrolled movement of the second frame section while the second frame section is rotating between the raised transport position and the lowered working position.

5. The implement of claim 1, wherein the second end of the actuating cylinder is configured to move within the slot while the second frame section is in the lowered working position.

6. The implement of claim 1, wherein the first end of the locking mechanism is substantially u-shaped, and includes a plurality of fingers configured to capture the second end of the actuating cylinder.

7. The implement of claim 1, wherein the first frame section includes a first toolbar, the second frame section includes a second tool bar, the bracket is mounted to the first tool bar, and the cam is mounted to the second tool bar.

8. An agricultural implement comprising:
   a first toolbar and a second toolbar pivotally coupled to one another;
   an actuating cylinder having a first end pivotally coupled to the second toolbar, and a second end directly coupled between longitudinal ends of a slot in a bracket fixedly mounted directly to the first toolbar, wherein the actuating cylinder is configured to drive the second toolbar to rotate between a raised transport position and a lowered working position, and the second end of the actuating cylinder is configured to move within the slot between the longitudinal ends; and
   a locking mechanism rotatably coupled to the bracket of the first toolbar, and configured to drive the second end of the actuating cylinder into a desired position within the slot in response to contact between a cam of the second toolbar and the locking mechanism.

9. The implement of claim 8, wherein the locking mechanism includes a first end rotatably coupled to the second end of the actuating cylinder, and a second end configured to abut the cam.

10. The implement of claim 8, wherein the locking mechanism includes a first end configured to capture the second end of the actuating cylinder within a plurality of fingers, and a second end configured to abut the cam.

11. The implement of claim 8, wherein the locking mechanism is configured to block uncontrolled movement of the second toolbar while the second toolbar is rotating between the raised transport position and the lowered working position.

12. The implement of claim 8, wherein the second end of the actuating cylinder is configured to move within the slot while the second toolbar is in the lowered working position.

13. The implement of claim 8, wherein the locking mechanism includes a first end configured to capture the second end of the actuating cylinder, and a substantially u-shaped second end configured to engage a substantially c-shaped end of the cam.

14. The implement of claim 8, wherein the locking mechanism is rotatably coupled to the bracket by a fastener.

15. An agricultural implement comprising:
   a first toolbar having a slot;
   a second toolbar pivotally coupled to the first toolbar;
   an actuating cylinder having a first end pivotally coupled to the second toolbar, and a second end directly coupled between longitudinal ends of the slot, wherein the second end is configured to slide within the slot between the longitudinal ends, and the actuating cylinder is configured to induce the second toolbar to rotate between a raised transport position and a lowered working position; and
   a locking assembly comprising a cam coupled to the second toolbar, and a locking mechanism rotatably coupled to the first toolbar, wherein the locking mechanism is configured to drive the second end of the actuating cylinder into a desired position within the slot in response to contact between the cam and the locking mechanism.

16. The implement of claim 15, wherein the first toolbar comprises a bracket the slot of the first toolbar is disposed within the bracket, and the locking mechanism is pivotally coupled to the bracket.

17. The implement of claim 15, wherein the locking mechanism includes a first end rotatably coupled to the second end of the actuating cylinder, and a second end configured to abut the cam.

18. The implement of claim 15, wherein the locking mechanism includes a first end configured to capture the second end of the actuating cylinder within a plurality of fingers, and a second end configured to abut the cam.

19. The implement of claim 15, wherein the locking mechanism is configured to block uncontrolled movement of the second toolbar while the second toolbar is rotating between the raised transport position and the lowered working position.

20. The implement of claim 15, wherein the second end of the actuating cylinder is configured to move within the slot while the second toolbar is in the lowered working position.

* * * * *